United States Patent [19]

Sugita

[11] Patent Number: 5,450,399
[45] Date of Patent: Sep. 12, 1995

[54] CLAD HAVING MAJORITY DECISION ADDRESS TABLE CONTROLLER

[75] Inventor: Masahiro Sugita, Tokyo, Japan

[73] Assignee: NEC Corporation, Japan

[21] Appl. No.: 264,431

[22] Filed: Jun. 23, 1994

[30] Foreign Application Priority Data

Jun. 23, 1993 [JP] Japan .................. 5-175993

[51] Int. Cl.⁶ .......................... H04J 3/26; H04L 12/56
[52] U.S. Cl. ................... 370/60.1; 370/85.13; 370/94.1
[58] Field of Search .................. 370/58.1, 58.2, 58.3, 370/60, 60.1, 85.1, 85.13, 85.14, 94.1, 94.2, 110.1

[56] References Cited

U.S. PATENT DOCUMENTS

| | | | |
|---|---|---|---|
| 4,975,906 | 12/1990 | Takiyasu et al. | 370/85.13 |
| 5,050,166 | 9/1991 | Cantoni et al. | 370/94.1 |
| 5,101,404 | 3/1992 | Kunimoto et al. | 370/60.1 |
| 5,113,392 | 5/1992 | Takiyasu et al. | 370/94.1 |
| 5,144,622 | 9/1992 | Takiyasu et al. | 370/85.13 |
| 5,280,476 | 1/1994 | Kojima et al. | 370/60.1 |

*Primary Examiner*—Alpus Hsu
*Attorney, Agent, or Firm*—Ostrolenk, Faber, Gerb & Soffen

[57] ABSTRACT

A cell assembly disassembly facility for interconnecting a local area network and an ATM switch includes an address table and a cell buffer for receiving ATM cells from the switch. A cell disassembler, connected to the cell buffer, disassembles the ATM cells into a packet for coupling to the LAN. The source address, VPI and VCI of each BOM (beginning-of-message) or SSM (single-segment-message) ATM cell in the cell buffer are stored into the DA, VPI and VCI fields of an entry of the table. Entries having identical source addresses (SA) are detected. If the same SA entries have different VPIs and VCIs, they are divided into at least two groups of entries. A majority decision is made on the entry groups to determine a winner. If one of the groups is determined to be a winner, the rest of the groups is erased and all the entries of the remaining group are then erased except for one entry. If there are two or more groups of largest number, all the entries of the groups are erased except for one that is most recently stored, or if at least one group of smaller number is present in addition to the groups of largest number, the smaller group is erased before erasing all entries other than the most recent one. When a packet is received by a packet buffer, the address table is searched for a DA field using the destination of the packet as a search key, and a VPI and a VCI are read from the entry of the DA field into each ATM cell that is sent to the ATM switch.

18 Claims, 2 Drawing Sheets

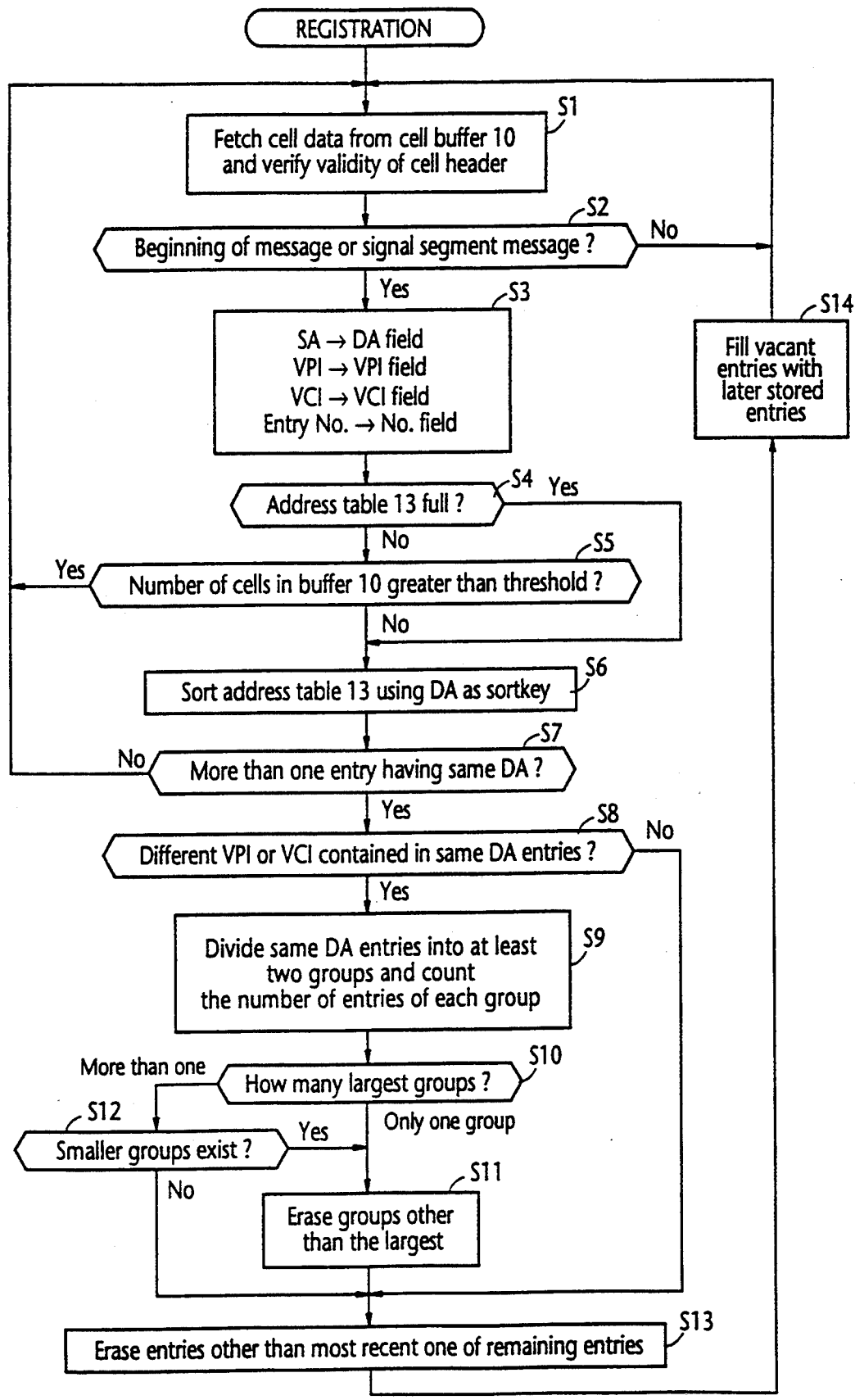

CLAD HAVING MAJORITY DECISION ADDRESS TABLE CONTROLLER

BACKGROUND OF THE INVENTION

1. Field of the Invention

The present invention relates generally to an inter-LAN (local area network) communication system wherein LAN terminals are interconnected by an ATM switch, and more specifically to an address updating technique for cell assembly disassembly facilities used between the ATM switch and the local area networks for adaptively updating the address information contained in the ATM cells received from the ATM switch.

2. Description of the Related Art

In a communication system in which local area networks such as Ethernet are interconnected by an ATM switch, the data handled by the LAN terminals are in the form of variable bit rate (VBR) packets, while the data handled by the ATM switch are in the form of fixed length ATM cells whose payload contains a source address (SA) and whose header contains a virtual path identifier (VPI) and a virtual channel identifier (VCI). A cell assembly disassembly facility is therefore provided at the interface between the ATM switch and each local area network to provide data format conversion between packets and ATM cells. ATM cells bearing the same address information are assembled into a packet, and an error check is performed on the packet using the CRC (cyclic redundant check) bits contained in the cells before the packet is sent to the local area network. The cell assembly disassembly facility includes an address table. If no error bits are detected by the CRC error check, the address table is searched for the same address information as that of the type of ATM cell such as BOM (beginning of message) or SSM (single segment message) cell. If there is none, the SA, VPI and VCI of the ATM cell is stored into the DA (destination address), VPI and VCI fields of a given entry together with a time-lapse indicator. If the same address information is already stored, the time-lapse indication of the registered address information is updated with that of the most recent BOM or SSM cell. The time-lapse indicators of all of the entries are incremented at periodic intervals. At longer intervals, the time-lapse indicators of all the entries are checked to erase those entries whose time-lapse indicators exceed a predetermined threshold to make them vacant for subsequent cells. On the other hand, when a packet is received from the local area network, the address table is searched for a DA field that matches the destination address of the packet. The packet is then assembled into one or more ATM cells each containing the VPI and VCI of the entry of the matched DA field.

Since the conventional cell assembly disassembly facility is required to make a search through the address table each time a CRC error check is made upon assemblage of a packet, the cell assembly disassembly facility is considerably overloaded.

SUMMARY OF THE INVENTION

It is therefore an object of the present invention to provide a table updating technique that significantly reduces the load of a cell assembly disassembly facility (CLAD).

According to a first aspect, the present invention provides a cell assembly disassembly facility for interconnecting a local area network and an ATM switch. The CLAD includes an address table in which a plurality of entries are defined, and a cell buffer connected to the ATM switch for receiving ATM cells therefrom, each of the ATM cells containing a source address, a VPI and a VCI. A cell disassembler connected to the cell buffer for disassembling ATM cells therefrom into a packet for coupling to the local area network. The source address, VPI and VCI of each ATM cell of the cell buffer are stored into one of the entries of the address table. Entries having identical source addresses are detected. All of the detected entries except for one entry are erased if the VPIs and VCIs of the detected entries are identical to each other. The detected entries are divided into at least two groups if the VPIs and VCIs of the detected entries differ from each other and a majority decision is made on the groups of entries to determine a winner. Leaving the group determined to be the winner, the rest of the groups is erased, and all of the entries of the group of the winner are erased except for one entry. On receiving a packet by the packet buffer, the address table is searched for a match between a source address in an entry and the destination address of the packet and a VPI and a VCI are read from that entry. A cell assembler is connected to the packet buffer for assembling the output of the packet buffer into ATM cells for coupling to the ATM switch by inserting the read VPI and VCI into each of the assembled ATM cells.

According to a second aspect, the present invention provides a method for updating an address table of a cell assembly disassembly facility which interconnects a local area network and an ATM switch. The address table is partitioned into a plurality of entries each comprising a destination address (DA) field, a VPI field and a VCI field. The method comprises storing the source address, VPI and VCI of each of ATM cells received from the ATM switch into the DA, VPI and VCI fields of one of the entries of the address table. The stored entries of the table are divided into at least two groups of same DA field according to the VPIs and VCIs of the groups, if there is more than one entry having an identical DA field but a different VPI or VCI, and counting the number of entries of each of the groups. The method includes making a first decision is made if there is only one group of largest number, a second decision if there are more than one group of same largest number and at least one group of smaller number, and a third decision if there is exclusively more than one group of largest number. In response to either of the first and second decisions, groups other than one group of the largest number are erased, and in response to the third decision, or following the erasing of the groups other than one group, one or more entries are erased other than a most recently stored one of the entries which remain in the table.

BRIEF DESCRIPTION OF THE DRAWINGS

The present invention will be described in further detail with reference to the accompanying drawings, in which:

FIG. 2 is a flowchart describing the operation of the address table controller of FIG. 1.

DETAILED DESCRIPTION

Figure 1:
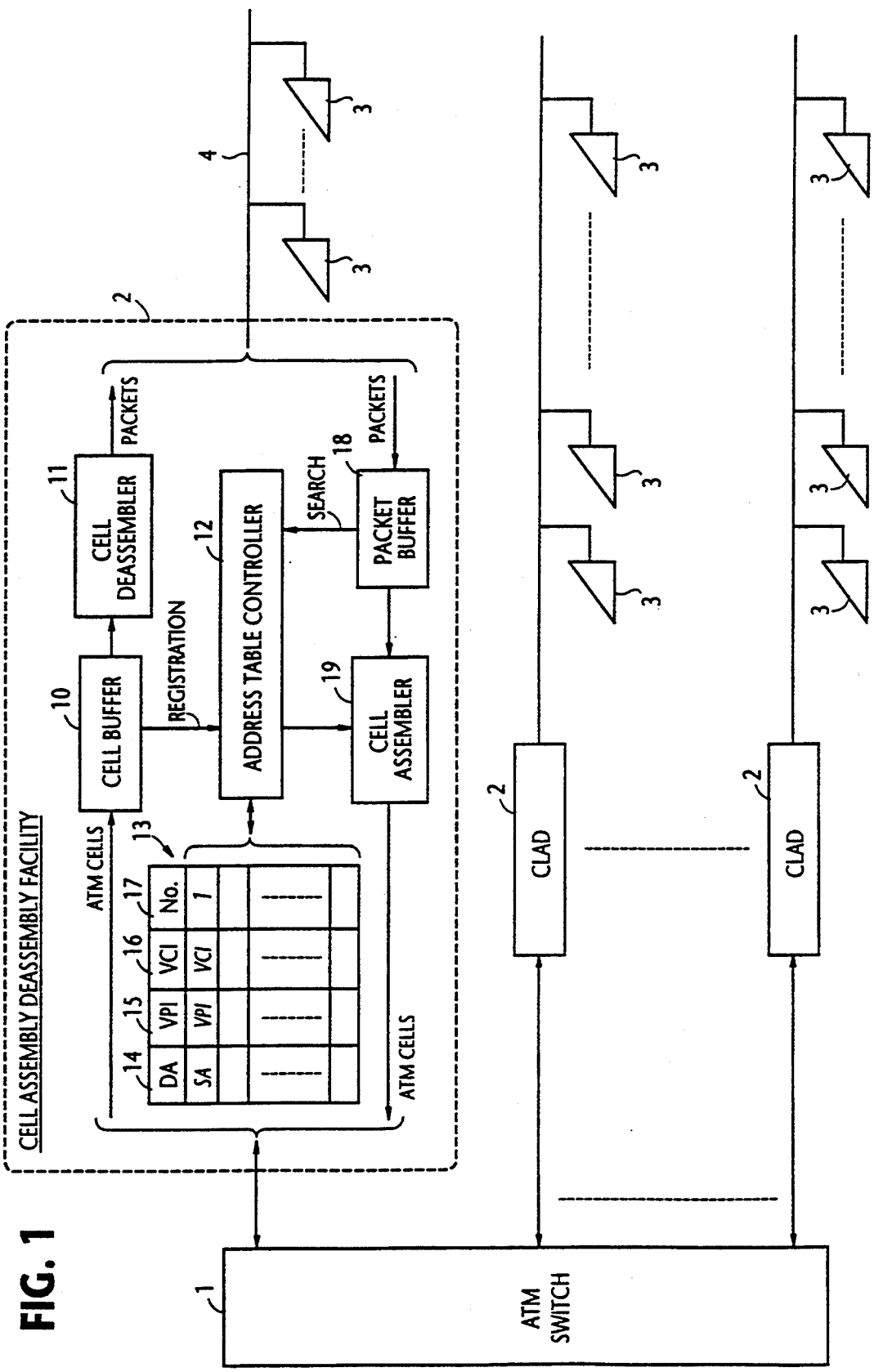
FIG. 1 is a block diagram of an ATM-switched LAN communication system in which the cell assembly disassembly facility of the present invention is embodied.

Referring now to FIG. 1, there is shown a communication system comprising an ATM (asynchronous transfer mode) switch 1 where incoming ATM cells are routed according to their destination address, a plurality of cell assembly disassembly facilities (CLADs) 2 and a plurality of local area networks (LANs) such as Ethernet, each being formed by a group of data terminals 3 connected to a common bus 4. If a packet from each LAN terminal is of such a length that can be accommodated within the ATM cell format, it is decomposed and sent to the ATM switch 1 as a series of ATM cells starting with a beginning-of-message (BOM) cell containing an SA, a VPI and a VCI, one or more continuation-of-message (COM) cells and terminating with an end-of-message (EOM) cell. If the packet can be accommodated within the ATM cell format, a single ATM cell called "single-segment-message" bearing address information (SA, VPI and VCI) is sent to the ATM switch.

As illustrated, each CLAD 2 comprises a cell buffer 10 for buffering ATM cells each containing address information (SA, VPI and VCI) from the ATM switch 1 and a cell disassembler 11 connected to the output of the cell buffer 10 for disassembling the cells of the same destination into a packet and making a CRC error check on the packet for transmission to the associated LAN terminals 3. An address table controller 12 is provided for storing the address information of the incoming cell from the cell buffer 10 into the address table 13 which is partitioned into a matrix of columns corresponding to a DA (destination address) field 14, VPI and VCI fields 15, 16 and an entry number field 17, instead of the periodically incremented time-lapse indicator of the prior art, and rows corresponding to entries for storing the address information and the entry numbers of respective ATM cells. A packet buffer 18 is connected to the common bus 4 for buffering packets from the associated LAN terminals and for allowing the controller 12 to make a search through the address table 13 for a destination address (DA) field using the destination address (DA) of each packet in the buffer 18 as a search key. Address controller 12 reads out the VPI and VCI data from the entry of the table 13 corresponding to the search key. The output of packet buffer 18 is connected to a cell assembler 19. Cell assembler 19 receives a packet from buffer 18 and the corresponding address information (VPI, VCI) from the controller 12 and assembles the packet into ATM cells by inserting the VPI and VCI into the cell header of all of the assembled ATM cells and inserting the source address of the packet into the payload of a BOM cell or an SSM cell for application to the ATM switch 1.

Address table controller 12 provides a registration routine according to the flowchart of FIG. 2. The program execution of the routine starts with step S1 to retrieve an ATM cell stored in the cell buffer 10 and verify the validity of the cell header using the HEC (header error control) check bits contained in the cell. If the header validity is verified, control exits to step S2 to determine whether the retrieved cell is a BOM or an SSM cell. If the answer is negative, control returns to the starting point of the program. Otherwise, control branches to step S3 to store the SA, VPI and VCI data of the cell into the DA, VPI and VCI fields 14, 15 and 16 of a vacant entry of the address table 13 as well as the entry number of the cell into the number field 17 of the entry, regardless of whether the same address information is already stored or not in the table. Since CRC error check has not been made on the packet that comprises the incoming cells, there is a possibility of error bits in the source address of the BOM or SSM cell. However, the registration of the cell is performed without taking into account the possibility of source address error. In this way, multiple entries may be filled with the same SA, VPI and VCI data if the same BOM and SSM cells are received from the ATM switch. Since the LAN terminals may move from one place to another, several entries of the table may have the same DA field, but different VPIs and VCIs.

Exit then is to decision step S4 to determine whether the address table 13 is full. If the table is not full, control branches at step S4 to step S5 to compare the number of ATM cells stored in the buffer 10 with a predetermined threshold value and determine whether it exceeds the threshold. If the answer is affirmative at step S5, control returns to the starting point of the program.

If the address table 13 is full, control branches at step S4 to step S6 to provide a sorting of all the address information stored in the address table, using the DA field 15 as a "sortkey" so that the the entries having the same DA values are arranged into groups. In order that the CLAD makes a full utilization of idle processing time, control branches at step S5 to step S6 if the number of cells in buffer 10 is lower than the threshold, indicating that the buffer is still able to receive cells from the ATM switch.

Exit then is to a subroutine in which it makes a majority decision on the stored address information having the same DA value. This subroutine begins with step S7 to determine whether there is more than one entry having the same DA value. If the answer is affirmative at step S7, control branches out to step S8 to determine whether different VPI or VCI values are contained in the same DA entries. If the answer is affirmative at step S8, control branches out to step S9 to divide those same DA entries into at least two groups E1 and E2, with the group E1 having $VPI_1$ and $VCI_1$ and the group E2 having $VPI_2$ and $VCI_2$, and count the number of entries of each group. Exit then is to decision step S10 to determine which group or groups are the largest and how many largest groups exist in the same DA entries. If there is only one group that is largest (or winner), control branches at step S10 to step S11 to erase entries other than the largest group, and advances to step S13 to erase entries other than the entry where the most recent one of the remaining entries by comparing their entry numbers with each other. If there is more than one group which is largest, control branches at step S10 to S12 to determine whether one or more smaller groups are present. If there is one, control exits to step S11 to erase the smaller group entries, and if there is none, control branches to step S13. Step S13 is also executed if the decision at step S8 is negative, i.e., all the same entries contain the same VPIs and VCIs.

After execution of step S13, control proceeds to step S14 to fill vacant entries by shifting later stored entries, and returns to the starting point of the routine.

For example, if the following same DA entries are stored and arranged in the address table in the order of arrival, they are divided into a group E1 of entries having DA, $VPI_1$ and $VCI_1$ and a group E2 of entries having DA, $VPI_2$ and $VCI_2$ as E2 at step S9 and the number of entries of each group is determined.

| E1 | DA | $VPI_1$ | $VCI_1$ | (1) |
| E1 | DA | $VPI_1$ | $VCI_1$ | (2) |
| E1 | DA | $VPI_1$ | $VCI_1$ | (3) |
| E2 | DA | $VPI_2$ | $VCI_2$ | (4) |
| E2 | DA | $VPI_2$ | $VCI_2$ | (5) |

At step S10, a decision is made that the number of entries of group E1 is larger than group E2 and there is only one largest group, so that control exits to step S11 to erase the address information DA, $VPI_2$ and $VCI_2$ of group E2, and control moves to step S13 to erase the group E1 entries with entry numbers 1 and 2, leaving the most recent one of the the remaining entry group, i.e., the entry number 3.

If the following five items of address information are stored,

| E1 | DA | $VPI_1$ | $VCI_1$ | (1) |
| E1 | DA | $VPI_1$ | $VCI_1$ | (2) |
| E1 | DA | $VPI_1$ | $VCI_1$ | (3) |
| E2 | DA | $VPI_2$ | $VCI_2$ | (4) |
| E2 | DA | $VPI_2$ | $VCI_2$ | (5) |
| E2 | DA | $VPI_2$ | $VCI_2$ | (6) | a decision is made that there is more than one group that is largest at step S10, and control branches to step S12 to determine if there is one or more smaller groups. Since there is none, control exits to step S13 to erase all address data except for the most recent data (entry number 6).

If the following five items of address information are stored,

| E1 | DA | $VPI_1$ | $VCI_1$ | (1) |
| E1 | DA | $VPI_1$ | $VCI_1$ | (2) |
| E1 | DA | $VPI_1$ | $VCI_1$ | (3) |
| E2 | DA | $VPI_2$ | $VCI_2$ | (4) |
| E2 | DA | $VPI_2$ | $VCI_2$ | (5) |
| E2 | DA | $VPI_2$ | $VCI_2$ | (6) |
| E3 | DA | $VPI_3$ | $VCI_3$ | (7) |
| E3 | DA | $VPI_3$ | $VCI_3$ | (8) | which differs from the above mentioned case in that a third group E3 with entry numbers 7 and 8 are additionally stored, an affirmative decision will be made at step S12. As a result, the third groups E3 are erased at step S11, and those with entry numbers 1 to 5 are erased at step S12, leaving the entry number 6.

Since the majority decision process is performed when the address table is full or when the CLAD is lightly loaded, the amount of load associated with the updating of the address table can be significantly reduced.

Additionally, the use of entry numbers, instead of the prior art time-lapse indicators, serves to simplify the registration routine.

Although address registration is made before CRC error check is made on the incoming ATM cells, there is a possibility of a false source address matching a valid source address. Since the entries storing the false source addresses have different VPI or VCI data from those of the valid ones and are smaller in number than the valid source addresses, such false entries may be removed from the address table as a result of the above described majority decision process.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A cell assembly disassembly facility for interconnecting a local area network and an Asynchronous Transfer Mode (ATM) switch, comprising:

a cell buffer connected to the ATM switch for receiving ATM cells therefrom, each of the ATM cells containing a source address, a virtual path identifier (VPI) and a virtual channel identifier (VCI);

a cell disassembler connected to the cell buffer for disassembling ATM cells therefrom into a packet for coupling to said local area network;

an address table having a plurality of entries each having a destination address (DA) field, a VPI field and a VCI field;

registration means for storing the source address, VPI and VCI of each ATM cell of said cell buffer into the DA, VPI and VCI of fields one of the entries of the address table, respectively;

majority decision means for detecting entries having identical DA fields, erasing all of said detected entries except for one entry if the VIPs and VCIs of the detected entries are identical to each other, dividing the detected entries into at least two groups if the VIPs and VCIs of the detected entries differ from each other, making a majority decision on said at least two groups to determine a winner, leaving the group determined to be the winner in said table by erasing the rest of said groups, and erasing entries other than most recent one of entries remaining in said table, erasing all of the entries of the group of said winner except for one entry;

a packet buffer connected to the local area network for receiving packets therefrom, each of the packets containing a destination address;

search means for making a search through said address table for detecting a match between a source address stored in one of said entries and the destination address of each packet from said packet buffer and reading a VPI and VCI from said one entry; and a cell assembler for utilizing the read VPI and VCI for assembling each packet from the packet buffer into one or more ATM cells for coupling to said ATM switch.

2. A cell assembly disassembly facility as claimed in claim 1, wherein said majority decision means is operative when the address table is full.

3. A cell assembly disassembly facility as claimed in claim 1, wherein said majority decision means is operative when the number of ATM cells in said cell buffer is smaller than a predetermined value.

4. A cell assembly disassembly facility as claimed in claim 2, wherein said majority decision means is operative when the number of ATM cells in said cell buffer is smaller than a predetermined value.

5. A cell assembly disassembly facility as claimed in claim 1, wherein said majority decision means includes means for sorting all the entries of said address table using the source address of each entry as a sortkey for rearranging the entries into groups having identical source addresses.

6. A cell assembly disassembly facility as claimed in claim 2, wherein said majority decision means includes means for sorting all the entries of said address table using the source address of each entry as a sortkey for rearranging the entries into groups having identical source addresses.

7. A cell assembly disassembly facility as claimed in claim 3, wherein said majority decision means includes means for sorting all the entries of said address table using the source address of each entry as a sortkey for rearranging the entries into groups having identical source addresses.

8. A cell assembly disassembly facility as claimed in claim 1, wherein said registration means includes means for storing said source address, VPI and VCI of each ATM cell of said cell buffer into said table entries before an error check is made on a plurality of the ATM cells which comprises a packet.

9. A cell assembly disassembly facility as claimed in claim 1, wherein each entry of said address table includes an entry number identifying the entry.

10. In a cell assembly disassembly facility for interconnecting a local area network and an Asynchronous Transfer Model (ATM) switch, comprising an address table having a plurality of entries each having a destination field (DA), a VPI field and a VCI field, a method comprising the steps of:
   a) storing a source address, VPI and CVI of ATM cells received from said ATM switch into the DA, VPI and VCI fields of one of the entries of the address table;
   b) dividing the stored entries of said table into at least two groups of same DA field according to the VPIs and VCIs of the groups, if there is more than one entry having an identical DA field but a different VPI or VCI, and counting the number of entries of each of said group;
   c) making a first decision if there is only one group of largest number, a second decision if there are more than one group of same largest number and at least one group of smaller number, and a third decision if there is exclusively more than one group of largest number;
   d) responsive to either of said first and second decisions, erasing groups other than one group of the largest number;
   e) responsive to said third decision, or following the step (d), erasing one or more entries other than a most recently stored one of the entries which remain in said table;
   f) making a search through said address table for detecting a match between one of said DA fields and the destination address of each packet from the packet buffer and reading a VPI and a VCI corresponding to said one DA field; and
   g) utilizing the read VPI and VCI for assembling each packet from the local area network into one or more ATM cells for coupling to said ATM switch.

11. In a cell assembly disassembly facility for interconnecting a local area network and an Asynchronous Transfer Model (ATM) switch, comprising:
   a cell buffer connected to the ATM switch for receiving ATM cells therefrom, each of the ATM cells containing a source address, a virtual path identifier (VPI) and a virtual channel identifier (VCI);
   a cell disassembler connected to the cell buffer for disassembling ATM cells therefrom into a packet for coupling to said local area network;
   a packet buffer connected to the local area network for receiving packets therefrom, each of the packets containing a destination address; and
   an address table having a plurality of entries each having a destination field (DA), a VPI field and a VCI field, a method comprising the steps of:
   a) storing the source address, VPI and VCI of each ATM cell of said cell buffer into the DA, VPI and VCI fields of one of the entries of the address table;
   b) dividing the stored entries of said table into at least two groups of same DA field according to the VPIs and VCIs of the groups, if there is more than one entry having an identical DA field but a different VPI or VCI, and counting the number of entries of each of said group;
   c) making a first decision if there is only one group of largest number, a second decision if there are more than one group of same largest number and at least one group of smaller number, and a third decision if there is exclusively more than one group of largest number;
   d) responsive to either of said first and second decisions, erasing groups other than one group of the largest number;
   e) responsive to said third decision, or following the step (d), erasing one or more entries other than a most recently stored one of the entries which remain in said table;
   f) making a search through said address table for detecting a match between one of said DA fields and the destination address of each packet from the packet buffer and reading a VPI and a VCI corresponding to the said one DA field; and
   g) utilizing the read VPI and VCI for assembling each packet from the local area network into one or more ATM cells for coupling to said ATM switch.

12. A method as claimed in claim 11, further comprising the step of determining whether the address table is full or not, and wherein the steps (b) to (e) are performed if the address table is determined to be full.

13. A method as claimed in claim 12, further comprising the step of sorting all of the entries of said address table using the source address of each entry as a sortkey and rearranging the entries into groups having identical source addresses before the step (b) is performed.

14. A method as claimed in claim 11, further comprising the step of determining whether the number of cells in said cell buffer are smaller than a predetermined number or not, and wherein the steps (b) to (e) are performed if the number of cells in said cell buffer are determined to be smaller than said predetermined number.

15. A method as claimed in claim 14, further comprising the step of determining whether the address table is full or not, and wherein the steps (b) to (e) are performed if the address table is determined to be full.

16. A method as claimed in claim 14, further comprising the step of sorting all of the entries of said address table using the source address of each entry as a sortkey and rearranging the entries into groups having identical source addresses before the step (b) is performed.

17. A method as claimed in claim 11, further comprising the step of sorting all of the entries of said address table using the source address of each entry as a sortkey and rearranging the entries into groups having identical source addresses before the step (b) is performed.

18. A method as claimed in claim 11, wherein the step (a) is performed before an error check is made on a plurality of ATM cells which comprise a packet.

* * * * *